US006745336B1

(12) United States Patent
Martonosi et al.

(10) Patent No.: US 6,745,336 B1
(45) Date of Patent: Jun. 1, 2004

(54) SYSTEM AND METHOD OF OPERAND VALUE BASED PROCESSOR OPTIMIZATION BY DETECTING A CONDITION OF PRE-DETERMINED NUMBER OF BITS AND SELECTIVELY DISABLING PRE-DETERMINED BIT-FIELDS BY CLOCK GATING

(75) Inventors: Margaret Martonosi, Skillman, NJ (US); David Brooks, Princeton, NJ (US)

(73) Assignee: Princeton University, Princeton, NJ (US)

( * ) Notice: Subject to any disclaimer, the term of this patent is extended or adjusted under 35 U.S.C. 154(b) by 0 days.

(21) Appl. No.: 09/574,793

(22) Filed: May 19, 2000

Related U.S. Application Data
(60) Provisional application No. 60/134,995, filed on May 20, 1999.

(51) Int. Cl.[7] .................................................. G06F 1/32
(52) U.S. Cl. ........................ 713/340; 713/340; 713/324; 713/300; 713/320; 713/323
(58) Field of Search ................................. 713/340, 300, 713/320, 323, 324

(56) References Cited

U.S. PATENT DOCUMENTS

| | | | | |
|---|---|---|---|---|
| 4,748,575 A | * | 5/1988 | Ashkin et al. | ............... 708/211 |
| 4,935,901 A | * | 6/1990 | Sasaki et al. | .......... 365/230.03 |

(List continued on next page.)

OTHER PUBLICATIONS

Brooks and Martonosi, *Value–Based Clock Gating and Operation Packing: Dynamic Strategies for Improving Processor Power and Performance*, Winter/Spring 2000.

Razdan, et al., *A High–Performance Microarchitecture with Hardware–Programmable Functional Units*, Proc. of MICRO–27, (Nov. 1994).

Lipasti et al., *The Performance Potential of Value and Dependence Prediction*, Department of Electrical and Computer Engineering, Carnegie Mellon University, Pittsburgh, PA 15213.

Gerosa, et al., *A 2.2 W, 80 MHz Superscalar RISC Microprocessor*, IEEE Journal of Solid–State Circuits, vol. 29, No. 12, Dec. 1994.

*Primary Examiner*—Thomas Lee
*Assistant Examiner*—Nitin C. Patel
(74) *Attorney, Agent, or Firm*—Woodcock Washburn LLP (57) ABSTRACT

Circuitry reduces power consumption by a microprocessor with operand-value-based clock gating. A bit detect unit detects the condition of a pre-determined number of bits of an operand. If the pre-determined number of bits are not necessary for executing the operand, a condition detect signal is generated. Gating logic receives the condition detect signal and initiates a gated clock signal. Latching circuitry or pre-charge circuitry receives the gated clock signal and disables the pre-determined number of bits, preventing the execution of unnecessary bits by the microprocessor and reducing the power consumed during execution. Operation packing improves microprocessor performance by packing narrow-width operations for parallel execution by the microprocessor. A bit detect unit detects the condition of a pre-determined number of bits of an operand and initiates a condition detect signal. Issue logic detects common operations within execution instructions and receives the condition detect signal, initiating an operation packing signal when common operations are ready to issue and the operands involved contain a pre-determined number of bits unnecessary for execution. Multiplexers receive the operation packing signal and move data from the lowermost bits of the operands to the upper sub-words of the source operand bus, creating a parallel sub-word operation. After execution, multiplexers move data from upper sub-words of the result onto the lowermost bit boundaries of the individual result operands.

41 Claims, 5 Drawing Sheets

U.S. PATENT DOCUMENTS

| | | | |
|---|---|---|---|
| 5,241,637 A | * 8/1993 | Skruhak et al. | 712/212 |
| 5,367,477 A | * 11/1994 | Hinds et al. | 708/525 |
| 5,420,808 A | 5/1995 | Alexander et al. | 364/707 |
| 5,539,681 A | 7/1996 | Alexander et al. | 364/707 |
| 5,642,306 A | * 6/1997 | Mennemeier et al. | 708/625 |
| 5,696,956 A | 12/1997 | Razdan et al. | 395/568 |
| 5,778,233 A | 7/1998 | Besaw et al. | 395/709 |
| 5,790,843 A | 8/1998 | Borkenhagen et al. | 395/567 |
| 5,815,725 A | 9/1998 | Feierbach | 395/750.04 |
| 5,819,064 A | 10/1998 | Razdan et al. | 395/500 |
| 5,822,786 A | * 10/1998 | Widigen et al. | 711/209 |
| 5,831,886 A | * 11/1998 | Wong | 708/670 |
| 5,907,842 A | 5/1999 | Mennemeier et al. | 707/7 |
| 5,924,120 A | 7/1999 | Razdan et al. | 711/141 |
| 6,038,381 A | * 3/2000 | Munch et al. | 716/1 |
| 6,088,808 A | * 7/2000 | Iwamura et al. | 713/324 |
| 6,173,300 B1 | * 1/2001 | Mahurin | 708/211 |
| 6,182,202 B1 | * 1/2001 | Muthukkaruppan | 711/212 |
| 6,247,134 B1 | * 6/2001 | Sproch et al. | 713/320 |
| 6,381,622 B1 | * 4/2002 | Lie | 708/211 |

* cited by examiner

| RUU STATIONS ||||
|---|---|---|---|
| RUU Op | SRC. OPERAND #1 DATA | SRC. OPERAND #2 DATA | ZERO48? |
| ADD | 0000..0000000000010001 | 0000..0000000000000010 | YES |
| SUB | 0110..1011001110010101 | 0101..0111000010010010 | NO |
| ADD | 0000..0000000000010101 | 0000..0000000000000011 | YES |

| FUNCTIONAL UNIT ||||
|---|---|---|---|
| ADD | 0000000000010101 | 0000000000010001 | OPERAND #1 |
|  | 0000000000000011 | 0000000000000010 | OPERAND #2 |

← CARRY CHAIN CUT HERE

SYSTEM AND METHOD OF OPERAND VALUE BASED PROCESSOR OPTIMIZATION BY DETECTING A CONDITION OF PRE-DETERMINED NUMBER OF BITS AND SELECTIVELY DISABLING PRE-DETERMINED BIT-FIELDS BY CLOCK GATING

RELATED APPLICATION

The present application claims priority from pending provisional application No. 60/134,995, filed on May 20, 1999, for "Operand-Value-Based Optimizations to Reduce Processor Power Consumption," which is incorporated in its entirety herein by reference.

U.S. STATES GOVERNMENT RIGHTS

Pursuant to 35 U.S.C. §202(c), the U.S. Government has certain rights in the present invention, which was developed in part with funds provided by the Defense Advanced Research Projects Agency under grant DABT63-97-C-1001 and the National Science Foundation under grant MIP-97-08624.

FIELD OF THE INVENTION

This invention relates generally to reducing power consumption and improving performance by a microprocessor, and particularly to a method and apparatus for dynamic optimization of arithmetic operations using operand-value-based detection to initiate clock-gating of execution units and the combination of multiple narrow-width operations for parallel execution.

BACKGROUND OF THE INVENTION

Power consumption and performance of a central processing unit (CPU) is dependent upon several factors including the number of bits processed and the number and type of operations performed. Software applications are another significant driver of power consumption caused by increased addressing needs that drives processor designs to 64-bit words or larger. Typically, microprocessor designs only allow for full 64-bit addressing and equivalent operations, however, not all available 64-bits are necessary at the time of execution. In fact, the inventors of the present invention have discovered that over half of the integer operations performed by a 64-bit processor require only 16-bits of processing or less, leaving at least 48-bits unnecessary but still consuming power. The inventors have identified that every execution containing such unnecessary bits represents an opportunity to save power by disabling the unnecessary bits or improve microprocessor performance by using the unnecessary bits to exploit the full capability or bitwidth of the processor at execution time.

In the past, unsuccessful attempts to reduce power consumption include pre-execution compile time operational code clock gating for only a limited number of operations. In these systems a clock is used to gate latches preceding the execution unit in an attempt to reduce the number of bits at execution time for certain operations. An instructional opcode such as an "add_byte" instruction is an example, because only the lower portion of an adder unit is required during execution.

One limitation in past systems is that opcode based optimization is not available in many of these systems due to a lack of restricted precision opcodes such as an "add_byte". Even if these precision opcodes are available, they can only be used at compile time. As a result, opcode based clock gating can only deliver marginal reductions in power consumption and no improvement in performance.

Another limitation in past systems is the use of narrow-width operands at compile time and the need to generate additional code to initiate subword parallelism, which is the use of multiple 8-bit or 16-bit operations by a 64-bit functional unit. The very use of programmers to identify instructions with narrow-width operands at compile time severely limits the opportunities to improve microprocessor performance by means of unnecessary bit utilization. Further, compilers cannot automatically generate the instructions needed by the processor at compile time.

Accordingly, the present invention addresses and solves the long felt need for significant reductions in microprocessor power consumption and increased performance by efficiently detecting unnecessary bits and disabling or utilizing these bits during execution. In stark contrast to these prior systems, the present invention uses operand-value-based techniques to significantly reduce power consumption or increase performance. Unlike systems in the past, operand-value-based techniques according to the present invention exploit every opportunity at execution time to disable unnecessary bits or to pack the unnecessary bit space, thereby reducing power consumption by as much as 60% in the execution unit, or increasing processor performance up to 10%.

SUMMARY OF THE INVENTION

The present invention is directed to a method and apparatus to reduce power consumption and increase performance of a microprocessor by optimizing the processing of narrow-width data when the higher order or uppermost bits of an operand are not necessary for execution.

In one embodiment of the present invention, run-time circuitry is provided for the detection of unnecessary higher order bits of an operand so that they may be disabled by clock gating prior to every execution in the processor. In contrast to prior opcode based systems, the present invention is the first to identify and use operand-value-based detection at run-time during every execution. Further, the unnecessary bits of an operand can also be effectively exploited by subword parallelism (operation packing) without programmer intervention or compiler support.

In another embodiment of the present invention, clock gating is used when a bit detect unit detects the condition of a pre-determined number of unused bits in an operand. Upon detection, a condition detect signal is generated and received by gating logic which initiates a gated clock signal. Latching circuitry receives the gated clock signal and disables the pre-determined number of bits of the operand. In another embodiment of the present invention, the gated clock signal disables pre-charge circuitry in the microprocessor, instead of the latching circuitry, to prevent the execution of unnecessary higher order bits.

In one aspect of the present invention, the bit detect unit detects zeros in the pre-determined number of bits of the operand. In another aspect of the present invention, the bit detect unit detects a one in the bits of the operand. A combination of zeros and ones could also be the condition detected by the bit detect unit for a pre-determined number of bits of the operand.

In another aspect of the present invention, the pre-determined number of bits is the uppermost 48-bits of the operand. In another aspect of the present invention, the pre-determined number of bits is the uppermost 31-bits of the operand. A combination of both 48-bits and 31-bits could also be the pre-determined number of bits of the operand. Other aspects of the present invention could include other bitwidths (bitfields), or other combinations of bitfields, as the pre-determined number of bits of the operand.

In another embodiment of the present invention, clock gating also includes an integer functional unit (execution unit), which executes the operand and creates a result. This embodiment also includes a multiplexer, which transfers the condition of the pre-determined number of bits onto a pre-determined number of bits of the result. The pre-determined number of bits of the result are the same, higher order bits, as those detected by the bit detection logic.

In another aspect of the present invention, the bit detect unit detects the condition of a pre-determined number of bits of an operand contained in a register. In other aspects of the present invention, the bit detect unit detects the condition of a pre-determined number of bits of the result, or detects the condition of the pre-determined number of bits of the result in combination with detecting the condition of the pre-determined number of bits of the operand in the register. Other aspects of the invention could detect the condition of pre-determined number of bits of an operand after register fetch of the operand, or during execution of the operand by condition detection of an intermediate carry out bit within the 64-bit execution. Other aspects of the invention could include any combination of the above condition detects.

In another embodiment of the present invention, clock gating is performed when the condition detect signal signifies the same condition for each of the two operands being executed. In other embodiments of the present invention, clock gating is performed when the condition detect signal signifies different conditions for the two operands being executed.

In another embodiment of the present invention, microprocessor performance is improved by operation packing, when the bit detect unit detects the condition of the pre-determined number of bits of an operand and generates a condition detect signal. Issue logic receives the condition detect signal and initiates an operation packing signal. Multiplexers receive the operation packing signal and move data from a lowermost sub-word of the operand onto an upper sub-word of an execution source operand bus, creating a parallel sub-word operation.

In another aspect of the present invention, the parallel sub-word operation contains four sub-words, with each sub-word containing 16-bits. In other aspects of the invention, the parallel sub-word operation could contain three or two sub-words, with each sub-word containing various bitwidths.

In another embodiment of the present invention, operation packing additionally includes an integer functional unit, which executes the parallel sub-word operation and creates a sub-word result. This embodiment also includes a second set of multiplexers, which move data from upper sub-words of the sub-word result onto a lowermost sub-word of an operand result, and a multiplexer transferring a bit condition onto the pre-determined number of bits of the operand result.

In another embodiment of the present invention, operation packing is performed when the condition detect signal signifies the same condition for each of the pairs of operands executed in the parallel sub-word operation. In other embodiments of the present invention, operation packing is performed when the condition detect signal signifies different conditions for each of the pairs of operands executed in the parallel sub-word operation.

In another embodiment of the present invention, thermal sensory data, or programmed switching selects whether clock gating or operation packing is implemented for the operand execution.

BRIEF DESCRIPTION OF THE DRAWINGS

These and other features, aspects and advantages of the present invention will become better understood with regard to the following description, appended claims, and accompanying drawings where:

DETAILED DESCRIPTION OF THE INVENTION

Figure 1:
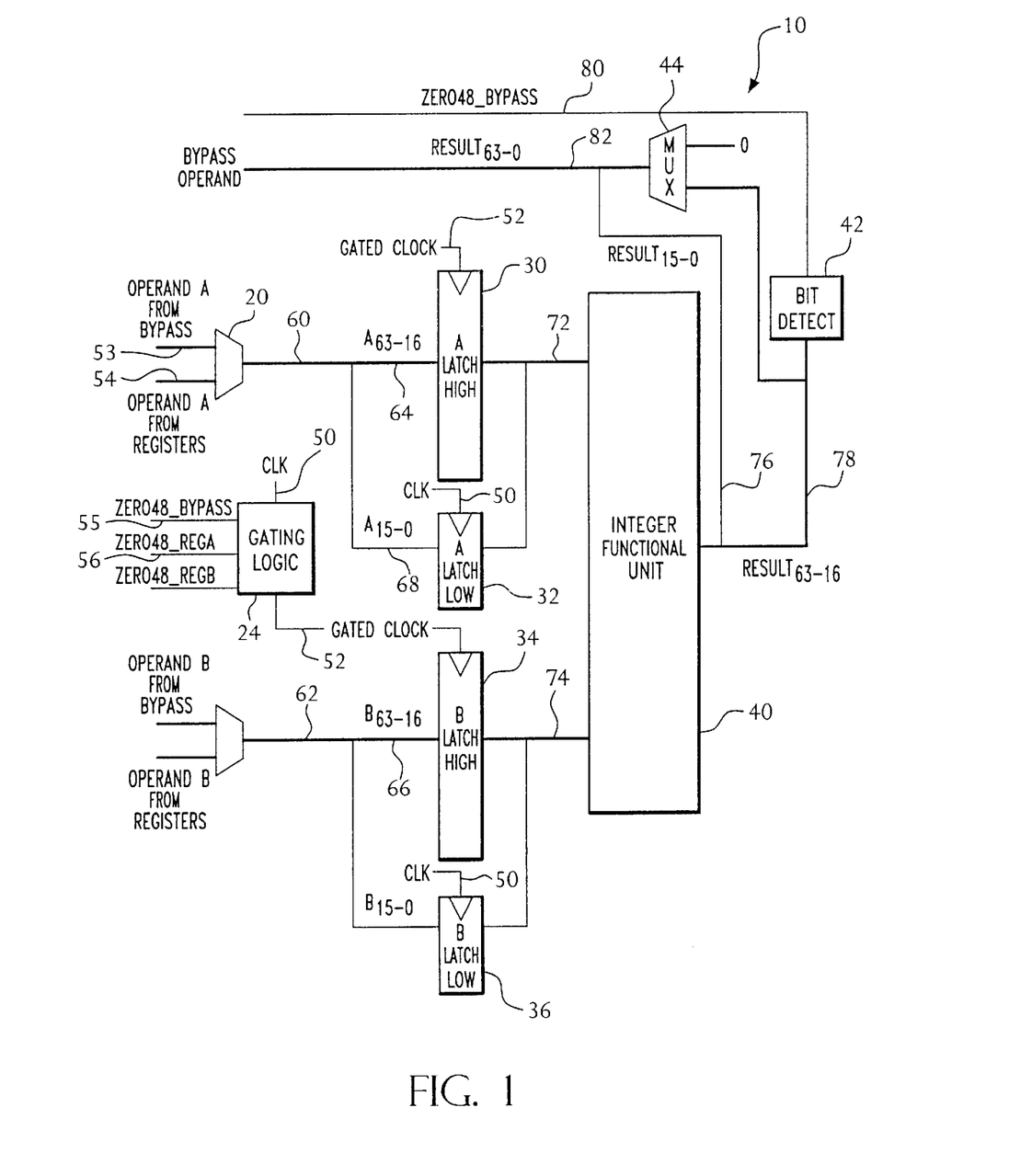
FIG. 1 illustrates a microprocessor having operand-value-based clock gating circuitry according to one embodiment of the present invention.

Referring now to the drawings, wherein like numerals indicate like elements, there is shown in FIG. 1 an illustration of microprocessor operand-value-based clock gating circuitry 10 according to one embodiment of the present invention. The microprocessor circuitry 10 includes an integer functional unit (execution unit) 40, a set of input latches 30,32 for input Operand-A having N-bits and a set of input latches 34,36 for input Operand-B having N-bits, gating logic circuitry 24, and bit (zero or one) detect unit 42.

The microprocessor circuitry 10 reduces the amount of power required to perform an operation upon an operand having N-bits (where N can be any number) by detecting and disabling a predetermined number of bits that are not required for execution of the N-bit operands. As shown in FIG. 1, bit detect unit 42, or other bit detect units (not shown) are used to detect whether a pre-determined number of bits of input Operand-A 60 and input Operand-B 62 are not necessary for execution by the integer functional unit 40. Bit detect unit 42, or other bit detect units (not shown), generate a condition detect signal which is provided with the respective operand during later processing and signifies whether the pre-determined number of bits of the operand are required for execution. As shown in FIG. 1, condition detect signal 80 is generated by bit detect unit 42 for result 82.

Operand-A 60 is provided by a register 54 or by a previous execution result 53 and sent to a multiplexer 20. A condition detect signal 55 is provided for Operand-A if Operand-A is a previous execution result 53, or a condition detect signal 56 is provided for Operand-A if Operand-A is provided from a register 54. The same procedure is followed for Operand-B.

Operand-A is partitioned for latching so that unnecessary bits can be disabled prior to execution. The uppermost 48-bits of Operand-A 64 are latched for execution by Operand-A high latch 30 and the lowermost 16-bits of Operand-A 68 are latched by Operand-A low latch 32. The same latching procedure is followed for Operand-B.

The condition detect signals for Operand-A and Operand-B are received by gating logic circuitry 24, which is an AND gate in parallel with a data bypass mux (not shown). When the condition detect signals signify that Operand-A 60 and Operand-B 62 contain zeros in their respective uppermost 48-bits, the gating logic circuitry 24 initiates a gated clock signal 52. The gated clock signal 52 triggers the Operand-A high latch 30 to disable the uppermost 48-bits of Operand-A, preventing unnecessary zero bit execution by the integer functional unit 40. The lowermost 16-bits of Operand-A 68 are always latched for execution by the Operand-A low latch 32, as triggered by a clock signal 50. The same latching procedure is followed for Operand-B.

The integer functional unit 40 receives selectively latched Operand-A 72 and selectively latched Operand-B 74, and executes the operation. The executed lowermost 16-bit result 76 is transferred to the 64-bit result 82. If the uppermost 48-bits of Operand-A 64 and Operand-B 66 were not executed by the integer functional unit 40, a result multiplexer 44 transfers zeros (or ones) onto the uppermost 48-bits of the 64-bit result 82.

Although the preceding specific example just described clock gating when two operands contain narrow bitwidths of 16-bits or less, it is to be understood that any number of bits for any number of operands can be detected and disabled as required. In addition, clock gating can proceed when only one operand contains a narrow bitwidth of 16-bits or less. In addition, the pre-determined number of bits includes, but is not limited to, one or more bitfields of fixed or variable size, the bitfields containing any number of bits from 1 to N, where N is the maximum bit size of the address register or integer functional unit of the microprocessor.

The preceding example reduces power consumption by disabling the pre-determined bitfield(s) of the operands in the latching circuitry prior to the integer functional unit. This microprocessor circuitry results in power savings for static CMOS circuits, which consume power when bit values change (between zero and one) during latching or execution. In dynamic, or domino CMOS circuits, power is dissipated when the individual, internal bits (not shown) of the integer functional unit are pre-charged to one by the clock signal and discharged to zero when the operand is received for execution and contains a zero for the respective bit. Preventing the pre-charge and discharge of pre-determined bitfields in the integer functional unit when these bitfields are unnecessary for operand execution reduces power consumption for dynamic CMOS circuits. Therefore, another embodiment of the present invention gates the clock signal sent to the pre-charge circuitry of the integer functional unit of dynamic CMOS circuits, preventing the pre-charge and discharge process for pre-determined bitfields detected as unnecessary for operand execution.

As discussed, bit detect unit 42 detects zeros in the uppermost 48-bits of the result 78. Since many operands come directly from the cache, there must also be condition detection occurring during load instructions. However, in some processors it may not be possible to perform condition detection on incoming loads; in these cases the hardware will not recognize opportunities to gate the clock.

As shown in FIG. 1, the condition detect signal 80 is generated after the integer functional unit 40 executes the specified operation. In processors with architecturally visible condition detect signals, such as the "Intel x86", "Motorola 68K", and "IBM/Motorola Power PC", the circuitry of FIG. 1 is operable because no additional serial delay is introduced. However, in other architectures, where adding a bit detect unit in the execute stage would affect cycle time, another embodiment is preferred. This embodiment relies on the fact that knowing whether the two source operands are 16-bits or less makes it relatively easy to determine whether the result is 16-bits or less. For example, in an arithmetic operation, if the carry out signal of the $16^{th}$ bit is zero and the two source operands are 16 bits or less, then the result will be 16-bits or less.

Thus, the condition detect signal is computed after the carry out of the $16^{th}$ bit is generated, which occurs before the completion of the final adder result. So, rather than perform condition detection after execution, this alternative embodiment performs condition detection in parallel with execution. Condition detection during execution is feasible because, although the carry out at 16-bits is not externally visible, it typically exists in 64-bit executions. Other intermediate carry outs also typically exist in 64-bit processors, and could be employed to detect unnecessary bits in further embodiments of this invention.

Finally, it may not be desirable to insert the condition detect signal into the register file or the reservation stations. In these cases, the condition detect signals are inserted after register fetch, while awaiting the return of the bypass results. This arrangement is possible because register read generally takes place in the first half of the cycle and writeback occurs in the second half of the cycle.

Figure 2:
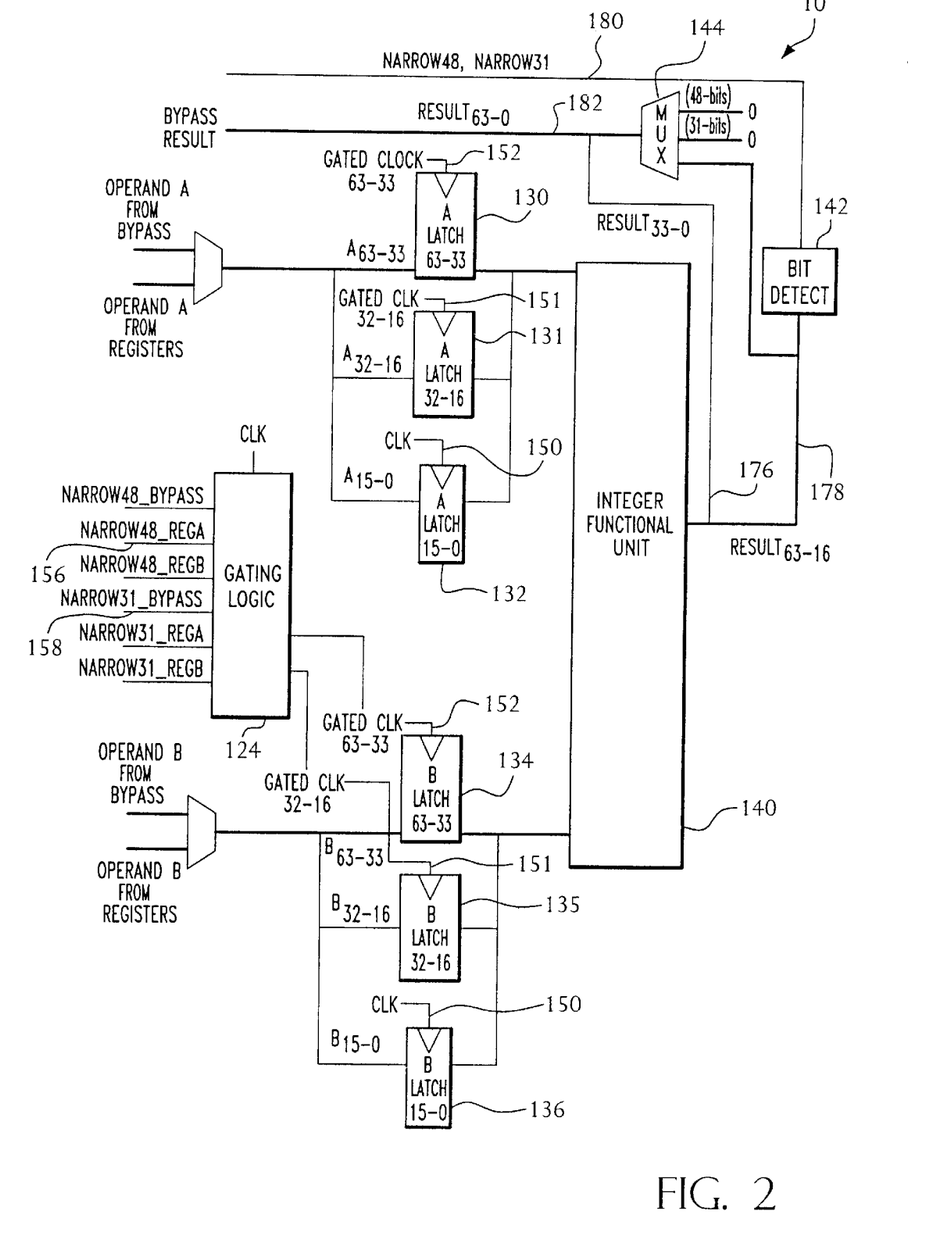
FIG. 2 illustrates a microprocessor having operand-value-based clock gating circuitry according to another embodiment of the present invention.

FIG. 2 is as illustration of expanded, 33-bit wide microprocessor operand-value-based clock gating 10 according to another embodiment of the present invention. Since address calculations result in many operations with 33-bits, it is statistically desirable to additionally perform clock gating when two operands contain narrow bitwidths of 33-bits or less. Two condition detect signals are provided with each operand in FIG. 2, one designating zeros in the uppermost 48-bits and one designating zeros in the uppermost 31-bits. If zeros exist in both the uppermost 31-bits and 48-bits of each operand, 48-bits are clock gated to maximize the reduction in power consumption during execution.

In FIG. 2, the condition detect signal 180 is 2-bits wide, designating zeros (or ones) in the uppermost 48-bits and in the uppermost 31-bits of the 64-bit result 182 ("narrow48" and "narrow31", respectively). The bit detect unit 142 performs the condition detect at both bitwidths and produces both condition detect signals, to minimize the additional hardware associated with this circuitry. Producing both bitwidth detects in one device is possible because zero (or one) detection for 31-bits can be computed within the zero (or one) detection for 48-bits. This dual detection also conserves power.

The gating logic circuitry 124 is widened to accommodate the additional condition detect signals associated with 33-bit and 48-bit condition detection. For example, "Narrow48_RegA" 156 represents the condition detect signal for the uppermost 48-bits of Operand-A from the registers. "Narrow31_Bypass" 158 represents the condition detect signal for the uppermost 31-bits of the bypass (i.e. previously executed result operand). The previously executed result operand could be Operand-A or Operand-B. The gating logic circuitry 124 initiates a first gated clock signal 151 if both input operands have zeros in their uppermost 48-bits, and a second gated clock signal 152 if both input operands have zeros in their uppermost 31-bits.

The lowermost 16-bits of Operand-A and Operand-B are always latched for execution by Operand-A low latch 132 and Operand-B low latch 136, respectively. In FIG. 2, the uppermost 48-bits of each operand are partitioned into a narrow 17-bit latch for bits "32–16" for Operand-A 131 and for Operand-B 135, and a narrow 31-bit latch for bits "63–33" for Operand-A 130 and for Operand-B 134.

For example, if only the uppermost 31-bits of both input operands are zeros, the second gated clock signal 152 is generated. The narrow 31-bit latch for bits "63–33" of Operand-A 130 and Operand-B 134 receives the second gated clock signal 152 and disables these unnecessary 31-bits, preventing their execution in the integer functional unit (execution unit) 140. The executed, lowermost 33-bit result 176 is transferred onto the 64-bit result 182. Result multiplexer 144 transfers zeros onto the uppermost 31-bits of 64-bit result 182. The bit detect unit 142 detects zeros in the uppermost 48-bits of the result 178, and initiates the 2-bit condition detect signal 180.

Negative numbers provide similar opportunities for the operand-value-based clock gating of narrow-width data. In Alpha architecture, the fundamental datum is the 64-bit quadword. Quadword integers are represented with a sign bit occupying the most significant bit. Numbers are expressed in two's compliment form which simplifies arithmetic operations. The microprocessor power reduction circuitry illustrated in FIGS. 1 and 2 rely on detecting whether the full bitwidths of the integer functional unit are necessary for execution. For positive numbers, this is accomplished by performing zero detection on the higher order (uppermost) bits. For negative numbers in the two's complement representation, leading one's signify unnecessary data. Thus, a ones detection (an AND of the higher order bits) is performed in parallel with the zero detection previously discussed, to perform condition detection of both positive and negative numbers. A separate condition detect signal signifying ones need not accompany the operand in the register file because this information can be derived by sampling one of the higher order bits. Therefore, FIGS. 1 and 2 can implement clock gating when zeros or ones are detected in the pre-determined number of bits of an operand.

FIGS. 1 and 2 illustrate clock gating at 16-bit and 33-bit boundaries. The 33-bit selection was chosen because a large number of operations exist with both source operands having 33-bits or less, due primarily to address calculations. The 16-bit selection is more arbitrary and reflects the need to balance two tradeoffs in the selection of the clock gating boundary. First, if the boundary is too large, the amount of power saved will not be as significant. On the other hand, if the boundary selected is too small, not enough operations will be eligible for clock gating at that boundary. Operand-value-based clock gating with boundaries at 16-bits and 33-bits is statistically close to optimal. If additional boundaries are desired, then 8-bit boundaries (i.e. 8, 16, 24, and 33-bits) statistically provide slightly better power savings, but at the expense of additional hardware complexity.

Operation packing improves microprocessor performance by merging narrow integer operations into a parallel sub-word operation. Like operand-value-based clock gating, operation packing relies on detecting ones or zeros in the uppermost bits of the operands to take advantage of bits unnecessary for execution in the integer functional unit. Operation packing concentrates on arithmetic, logical, and shift operations. Multiply operations are not implemented in the following embodiments, although it is possible in some instances.

Figure 3:
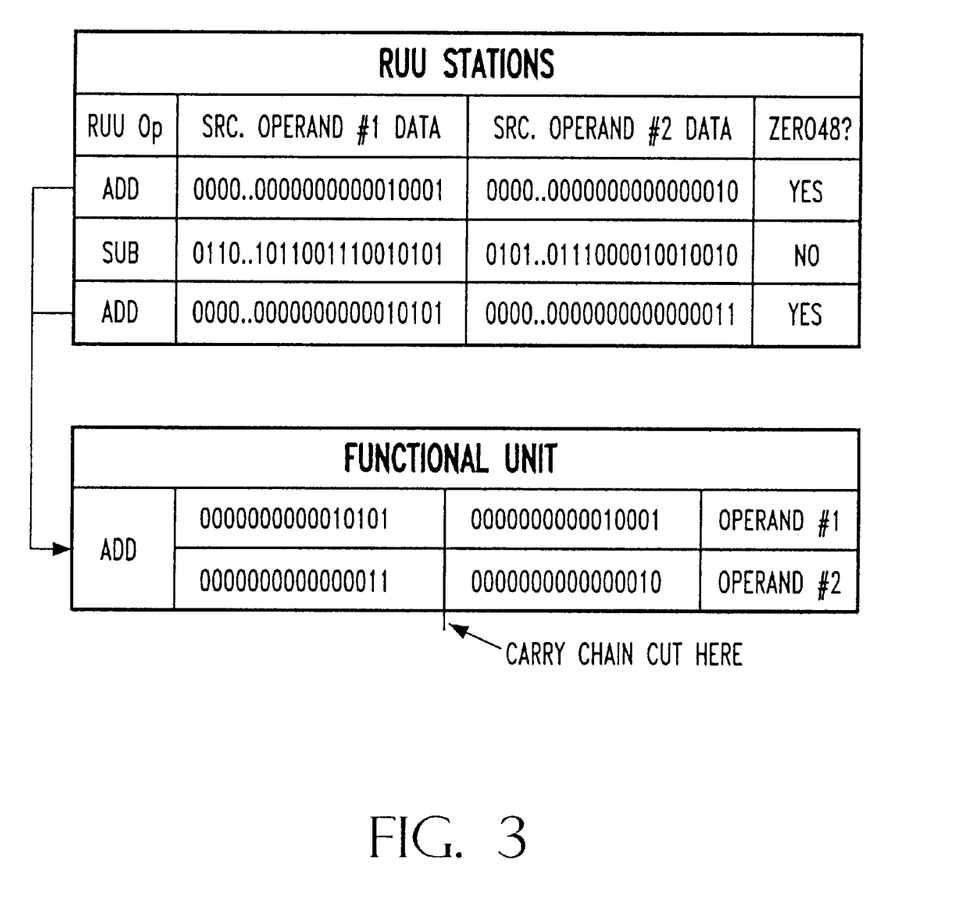
FIG. 3 illustrates two narrow-width operands with common operations that are merged to create one parallel sub-word.

FIG. 3 illustrates how two add operations in the reservation update unit (RUU), both with narrow-width operands, are packed together at issue time into a parallel sub-word operation. FIG. 3 shows three operations in the RUU: an add with source operand values of "17" and "2", a sub with source operands that are larger than 16-bits, and another add with source operands of "21" and "3". Since the two add operations have narrow-width operands, a single 64-bit adder can perform the two additions in parallel.

Merging narrow integer operations into a parallel sub-word operation is currently supported by computers with multimedia instruction set extensions. In machines with multimedia instruction sets, programmers or compilers statically generate code, using multimedia instructions, to perform a common operation on several sub-words in parallel. As such, few hardware changes are necessary to implement the sub-word parallelism (operation packing) present in this invention; only the carry chain between the 16-bitwidths is handled differently.

Figure 4:
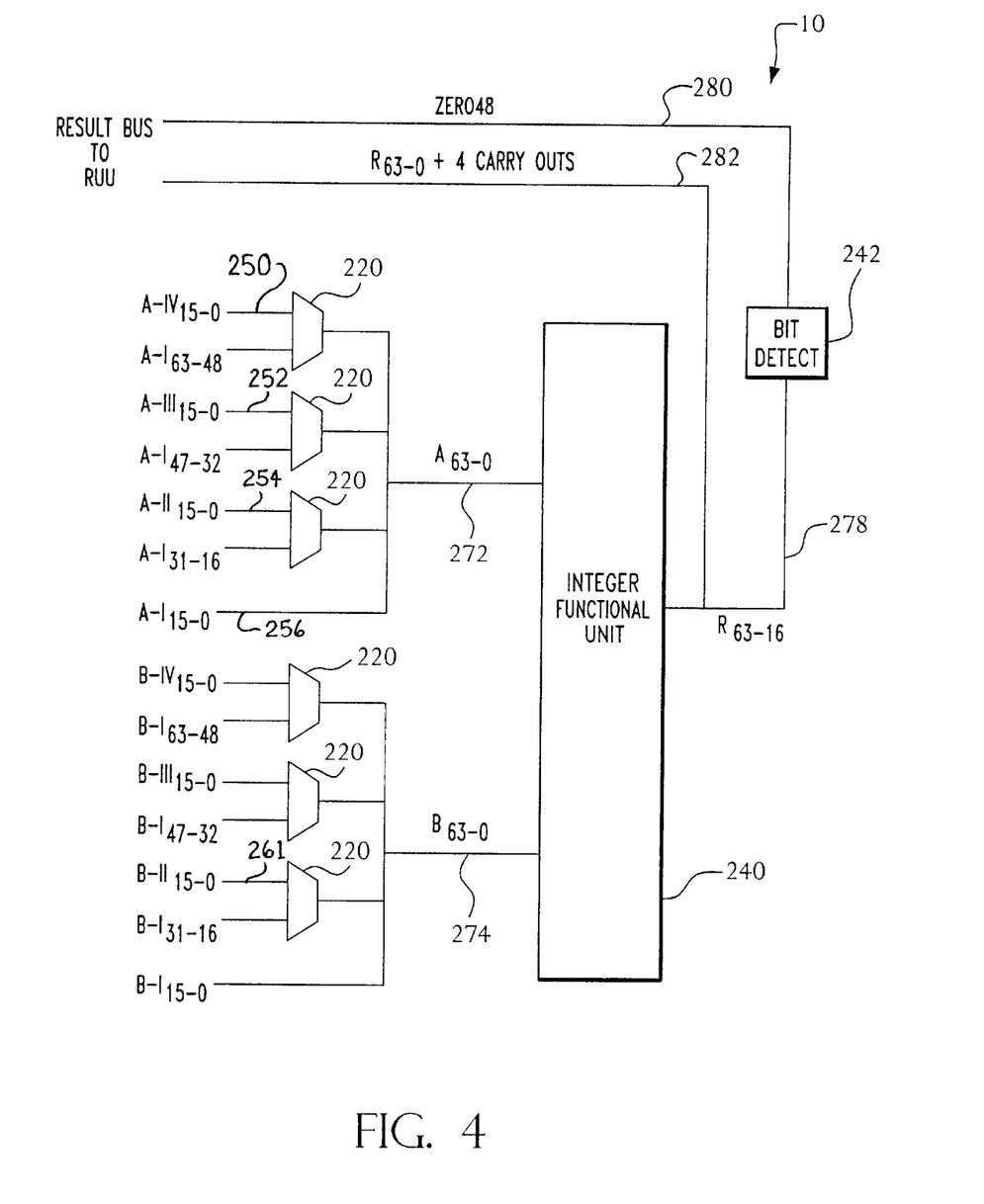
FIG. 4 illustrates a microprocessor having operand-value-based operation packing circuitry according to a third embodiment of the present invention.

FIG. 4 is an illustration of a microprocessor with operand-value-based operation packing 10 according to another embodiment of the present invention. FIG. 4 illustrates circuitry capable of executing up to four narrow-width operations in parallel. The microprocessor circuitry 10 includes an integer functional unit (execution unit) 240, a bit (zero or one) detect unit 242 and a set of multiplexers 220 to shift the data into parallel sub-words. The multiplexers 220 move data from the lowermost sub-word (16-bits) of operands from source RUU stations onto upper 16-bit sub-words of a source Operand-A bus 272 and a source Operand-B bus 274 for parallel execution in a integer functional unit 240.

The bit detect unit 242 detects whether the uppermost 48-bits of the result operand 278 are necessary for execution and generates a condition detect signal 280. The condition detect signal 280 is sent to the RUU along with the 64-bit result 282 for further processing. Similar to the clock gating circuitry discussed above, detecting the condition of an operand can occur in various locations within the microprocessor by various methods, and the conditions detected can be zeros and/or ones.

In FIG. 4, the input operands from the RUU are designated "A" for Operand-A and "B" for Operand-B. "A-I" denotes the default case where only one 64-bit operand is executed. The numerals denote the individual 16-bit portions of the 64-bit path. "A-II" 254, "A-III" 252, and "A-IV" 250 represent possible packed operands in the upper sub-words of the source Operand-A bus 272. For example, "A-IV$_{15-0}$" 250 represents the lowermost 16-bits of the fourth Operand-A packed (or paralleled) into one sub-word operation. The same procedure is followed for Operand-B.

In FIG. 4, a narrow integer operation is 16-bits, so each sub-word contains 16-bits. It is understood that operation packing circuitry could pack a different number of sub-words containing different bitwidths.

An opportunity for operation packing exists when three requirements are satisfied: the instructions must have satisfied their data dependencies and be ready to issue; the instructions must have narrow-width operands; and the instructions must perform the same operation. Normally, the issue logic (not shown) issues ready instructions from the RUU using its normal algorithm (oldest ready-to-issue instructions first). When implementing operation packing, the issue logic must additionally receive the condition detect signal and determine which issuing instructions perform common operations. If all three operation packing requirements are satisfied, the issue logic generates an operation packing signal (not shown) which sets the appropriate multiplexers 220 to issue the packed instructions.

A typical 64-bit operand from the RUU, for example "A-I" in FIG. 4, is partitioned into 16-bit segments (sub-words). The lowermost sub-word, "A-I$_{15-0}$" 256 is connected directly to the 64-bit source Operand-A bus 272 for execution by the integer functional unit 240. When an opportunity exists for operation packing, another 16-bit operand is packed alongside "A-I$_{15-0}$" 256 for parallel execution in the integer functional unit 240. For example, the lowermost 16-bits of "A-II" 254 are multiplexed 220 onto the "31–16" bitpath of the source Operand-A bus 272. Similarly "B-II$_{15-0}$" 261 is multiplexed 220 onto the "31–16" bitpath of the source Operand-B bus 274.

Upon execution, the 64-bit sub-word result 282 is transferred to the RUU. Operation packing requires the addition of 4-bits to the sub-word result 282, for any carry-out resulting from the addition of four sets of 16-bit sub-words. The additional carry-out lines are needed because most multimedia instruction sets provide a form of saturating arithmetic which, upon overflow of the 16-bit value, sets the result to the maximum 16-bit value, namely "OxFFFF".

Figure 5:
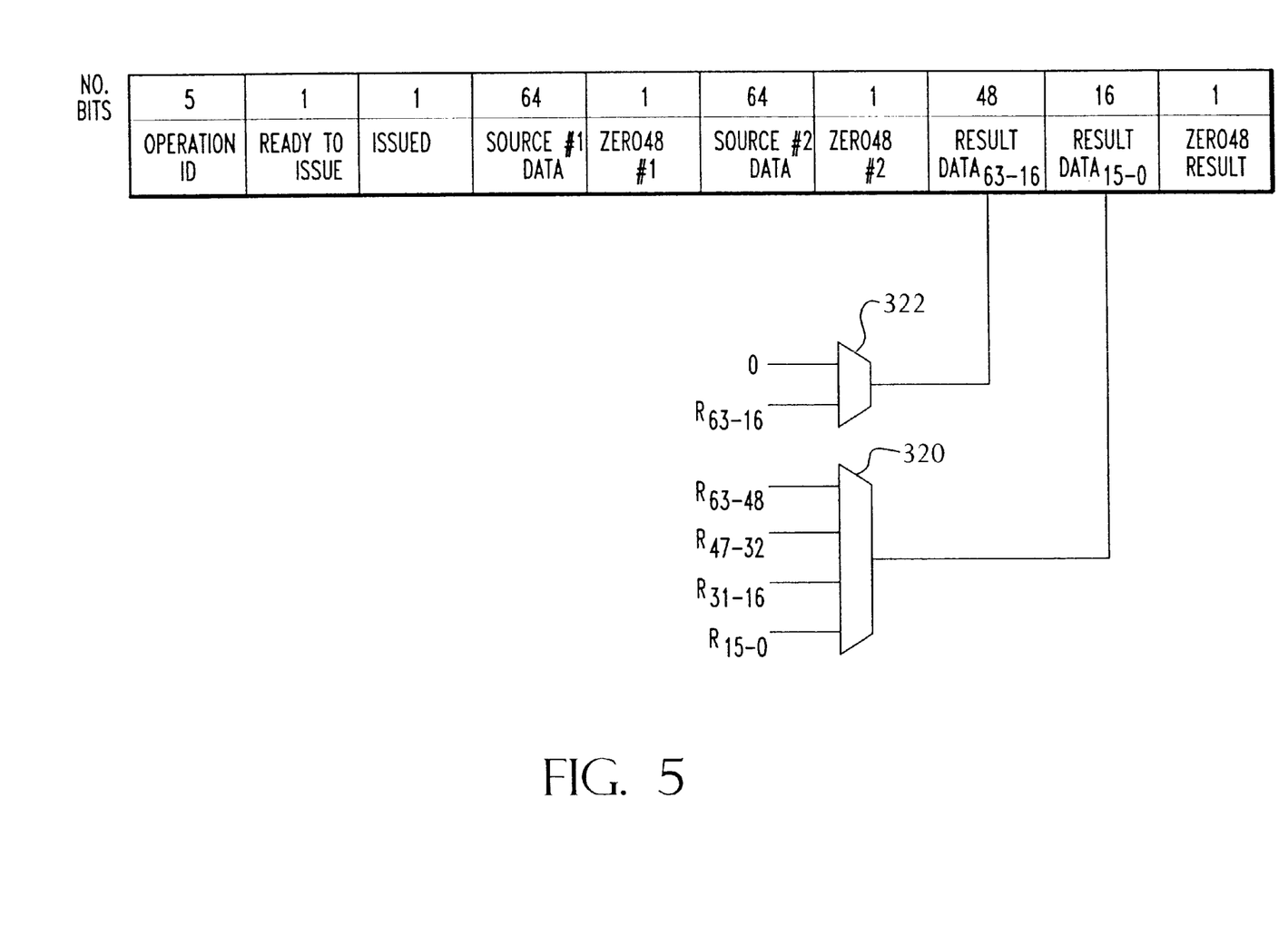
FIG. 5 illustrates a reservation update unit associated with a microprocessor having operation packing circuitry as shown in FIG. 4.

FIG. 5 is an illustration of an RUU showing features implementing the operation packing circuitry of FIG. 4, according to another embodiment of the invention. Operation packing requires a multiplexer 320 to reverse the packing of the parallel sub-word operation. Data in the higher 16-bit sub-words of the sub-word result 282 are multiplexed 320 onto the lowermost 16-bit boundaries (sub-word) of an operand result, and written back to the RUU. For each 16-bit operand result written back to the lowermost 16-bit boundary of the RUU, zeros or ones are multiplexed 322 onto the uppermost 48-bits, to complete the 64-bit operand result in the RUU.

Many of the additional multiplexers necessary to implement operation packing already exist in processors with multimedia instruction sets. For example, the "HP MAX-2" instruction set includes instructions to select any field in a source register and right-align it in the target register. Also, instructions exist to select a right-aligned field from the source register and place it anywhere in the target register. In FIG. 4, the multiplexers 220 preceding the integer functional unit 240 exist in most processors, to select whether the input source operands come from the RUU or from the forwarding path. These existing multiplexers need only be widened by one source input to implement the operation packing of the present invention. These processors also have integer functional units designed to disable the carry chain at 16-bit intervals. Therefore, the primary hardware cost associated with operation packing is in the increased complexity of the logic that decides when packed instructions can issue.

The embodiment of FIG. 4 packs up to four narrow-width instructions (sub-words) for parallel execution, selected from anywhere within an 80-entry RUU. The two main sources of complexity for implementing operation packing are routing 16-bit sub-words from the low 16-bits of the original source operands to the upper three sub-words of the source operand bus, and having the issue logic determine when opportunities for packing exist. In other aspects of the present invention, operation packing is simplified when two or three sub-words, instead of four, are executed in parallel. Another simplification limits the search for operation packing opportunities to "16" instruction blocks in the 80-entry RUU.

Since clock gating involves disabling bits in the integer functional unit and operation packing involves executing parallel sub-word operations, only one technique can be used at a time. However, because each technique shares a common hardware base, another aspect of the present invention implements both techniques and selects whether to perform clock gating or operation packing. Thermal sensory data is used to switch between clock gating and operation packing, depending on microprocessor thermal or performance concerns. Thermal switching provides a balancing of microprocessor performance with reduced power dissipation, depending on varying circumstances. Related approaches to thermal switching are presently found in commercial processors. For example, the "IBM/Motorola PPC750" is equipped with an on-chip thermal assist unit and an on-chip temperature sensor which responds to thermal emergencies by controlling the instruction fetch rate through I-cache throttling. However, various switching techniques could also be employed, from random switching to switching based on a programmed matrix.

The operand-value-based clock gating and operation packing techniques, above, can both be extended to speculatively exploit narrow-width operands. The requirement that both input operands be less than 16-bits excludes a large number of arithmetic operations used for memory addressing and loop incrementing. In many of these cases, one input operand is large, while the other is small. Often it is unlikely that adding large and small operands will result in a carry that ripples above the 16-bit boundary. So, proceeding speculatively, assuming that no overflow from the 16-bit operation will occur, creates additional opportunities to either reduce power consumption or improve performance by a microprocessor.

Respectively referred to as "replay clock gating" and "replay packing", both speculative techniques are implemented as previously discussed for clock gating and operation packing. However, the uppermost 48-bits of the larger source operand are multiplexed onto the uppermost 48-bits of the result, instead of zeros, before the result is transferred to the destination RUU station. If overflow above the 16-bit execution occurs, the instruction is squashed and re-executed as a full-width instruction. Squashing and re-execution is implemented by "replay traps", already available for other purposes in the "Alpha 21164" and in other CPU's. The "replay trap" is triggered by the carry out signal generated by the respective 16-bit execution overflow.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed:

1. Circuitry to reduce the power consumed by a microprocessor, the circuitry comprising:
   a. a bit detect unit that detects the condition of a pre-determined number of bits of an operand and generates a condition detect signal;
   b. gating logic that receives the condition detect signal and initiates a gated clock signal at execution of a functional unit; and
   c. latching circuitry that receives the gated clock signal and disables the pre-determined number of bits of the operand without disabling an entire functional unit.

2. The circuitry of claim 1, further comprising:
   a. an integer functional unit that executes the operand and creates a result from which the condition of the pre-determined number of bits are detected; and b. a multiplexer that transfers a bit condition onto a pre-determined number of bits of the result.

3. The circuitry of claim 1, wherein the condition detect signal is generated at completion of execution.

4. The circuitry of claim 1, wherein the condition of the pre-determined number of bits is detected in an execution result.

5. The circuitry of claim 1, wherein the condition of the pre-determined number of bits is detected during an execution cycle.

6. The circuitry of claim 1, wherein the condition detect signal is generated after the carry out of the $16^{th}$ bit of the result is determined.

7. The circuitry of claim 1, wherein the bit detect unit proceeds speculatively, and replay clock gating is employed to disable the pre-determined number of bits of the operand when at least one source operand exceeds N minus the pre-determined number of bits, where N is the maximum bit size of the operand.

8. The circuitry of claim 7, wherein the uppermost pre-determined number of bits of a larger source operand are multiplexed onto the uppermost pre-determined number of bits of the execution result.

9. A method to reduce power consumption by a microprocessor, comprising the steps of:
   a. detecting the condition of a pre-determined number of bits of an operand and generating a condition detect signal;
   b. receiving the condition detect signal and generating a gated clock signal at execution of a functional unit; and
   c. receiving the gated clock signal and disabling the pre-determined number of bits of the operand preventing the execution of the pre-determined number of bits without disabling an entire functional unit.

10. The method of claim 9, further comprising the steps of:
    a. executing the operand and creating a result from which the condition of the pre-determined number of bits are detected; and
    b. transferring a bit condition onto a pre-determined number of bits of the result.

11. The method of claim 9, wherein the condition detect signal is generated at completion of execution.

12. The method of claim 9, wherein detecting the condition of the pre-determined number of bits occurs in an execution result.

13. The method of claim 9, wherein detecting the condition of the pre-determined number of bits occurs during an execution cycle.

14. The method of claim 9, wherein the condition detect signal is generated after the carry out of the $16^{th}$ bit of the result is determined.

15. The method of claim 9, wherein the gated clock signal is generated speculatively, employing replay clock gating to disable the pre-determined number of bits of the operand.

16. The method of claim 15, wherein the uppermost pre-determined number of bits of a larger source operand are multiplexed onto the uppermost pre-determined number of bits of the execution result.

17. Circuitry to improve microprocessor performance, comprising:
    a. a bit detect unit that detects the condition of a pre-determined number of bits of an operand and generates a condition detect signal;
    b. issue logic that receives the condition detect signal and initiates an operation packing signal; and
    c. a plurality of multiplexers that receives the operation packing signal and moves data from a lowermost sub-word of the operand onto an upper sub-word of an execution source bus, creating a parallel sub-word operation.

18. The circuitry of claim 17, further comprising:
    a. an integer functional unit that executes the parallel sub-word operation and creates a sub-word result;
    b. a multiplexer that moves data from upper sub-words of the sub-word result onto a lowermost sub-word of respective operand results; and
    c. a second multiplexer transferring a bit condition onto a pre-determined number of bits of each operand result.

19. The circuitry of claim 17, wherein the condition detect signal is generated after an integer functional unit executes a specified operation.

20. The circuitry of claim 17, wherein the bit detect unit is located in an execute stage of an operation.

21. The circuitry of claim 17, wherein the condition of the pre-determined number of bits is detected during an execution cycle.

22. The circuitry of claim 17, wherein the operation packing signal is initiated during an execution cycle.

23. The circuitry of claim 17, wherein the bit detect unit proceeds speculatively, employing replay packing.

24. The circuitry of claim 23, wherein the uppermost pre-determined number of bits of a larger source operand are multiplexed onto the uppermost pre-determined number of bits of the execution result.

25. A method for improving microprocessor performance, comprising the steps of:
    a. detecting the condition of a pre-determined number of bits of an operand and generating a condition detect signal;
    b. receiving the condition detect signal and generating an operation packing signal; and
    c. receiving the operation packing signal and moving data from a lowermost sub-word of the operand onto an upper sub-word of an execution source operand bus, creating a parallel sub-word operation.

26. The method of claim 25, further comprising:
    a. executing the parallel sub-word operation and creating a sub-word result;
    b. moving data from upper sub-words of the sub-word result onto a lowermost sub-word of an operand result; and
    c. transferring a bit condition onto a pre-determined number of bits of the operand result.

27. The method of claim 25, wherein the condition detect signal is generated after an integer functional unit executes a specified operation.

28. The method of claim 25, wherein the condition of the pre-determined number of bits is detected during an execution cycle.

29. The method of claim 25, wherein the operation packing signal is generated at execution of a functional unit.

30. The circuitry of claim 25, wherein the operation packing signal is generated speculatively, and employs replay packing.

31. The circuitry of claim 30, wherein the uppermost pre-determined number of bits of a larger source operand are multiplexed onto the uppermost pre-determined number of bits of the execution result.

32. Circuitry to reduce the power consumed by a microprocessor, the circuitry comprising:
    a. a bit detect unit that detects the condition of one or more pre-determined bitfields of an operand and generates one or more condition detect signals;

b. gating logic that receives the one or more condition detect signals, and initiates one or more gated clock signals at execution of a functional unit; and c. circuitry that receives the one or more gated clock signals and disables the one or more pre-determined bitfields of the operand.

33. The circuitry of claim 32, comprising:

a. an integer functional unit that executes one or more operands and creates a result from which the condition of the pre-determined number of bits are detected; and b. a multiplexer that transfers a bit condition onto one or more pre-determined bitfields of the result.

34. The circuitry of claim 32, wherein the pre-determined bitfields each include a fixed or variable number of bits.

35. The circuitry of claim 32, wherein the pre-determined bitfields each include a number of bits from 1 to N, where N is the maximum bit size of the microprocessor.

36. The circuitry of claim 32, wherein the pre-determined bitfields total two in number, the first bitfield containing 48-bits and the second bitfield containing 31-bits.

37. The circuitry of claim 32, wherein the pre-determined bitfields total four in number, the first bitfield containing 56-bits, the second bitfield containing 48-bits, the third bitfield containing 40-bits, and the fourth bitfield containing 31-bits.

38. A computer including circuitry to reduce the power consumed by a microprocessor and to improve microprocessor performance, the computer comprising:

a bit detect unit that detects the condition of a pre-determined number of bits of a result operand and generates a condition detect signal at execution;

gating logic that receives the condition detect signal and generates a gated clock signal after execution commences;

latching circuitry that receives the gated clock signal and disables the pre-determined number of bits of the operand; and an integer functional unit that executes the operand and creates the result.

39. The circuitry of claim 38, wherein the condition detect signal is generated after the carry out of the $16^{th}$ bit of the result is determined.

40. A method for reducing power consumed by a microprocessor and for improving microprocessor performance, the method comprising the steps of:

detecting the condition of a pre-determined number of bits of a result operand and generating a condition detect signal at execution of an operation;

receiving the condition detect signal and generating a gated clock signal after operation execution commences;

receiving the gated clock signal and disabling the pre-determined number of bits of the operand; and executing the operand and determining the result.

41. The method of claim 40, wherein the condition detect signal is generated after the carry out of the $16^{th}$ bit of the result is determined.

* * * * *